US010785259B2

(12) United States Patent
Wada et al.

(10) Patent No.: US 10,785,259 B2
(45) Date of Patent: Sep. 22, 2020

(54) RELAY DEVICE

(71) Applicant: MITSUBISHI ELECTRIC CORPORATION, Tokyo (JP)

(72) Inventors: Yuta Wada, Tokyo (JP); Masaaki Takeyasu, Tokyo (JP); Daiki Kawakami, Tokyo (JP); Mikiya Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 27 days.

(21) Appl. No.: 16/078,538

(22) PCT Filed: Apr. 19, 2016

(86) PCT No.: PCT/JP2016/062330
§ 371 (c)(1),
(2) Date: Aug. 21, 2018

(87) PCT Pub. No.: WO2017/183099
PCT Pub. Date: Oct. 26, 2017

(65) Prior Publication Data
US 2019/0052674 A1 Feb. 14, 2019

(51) Int. Cl.
*H04L 29/06* (2006.01)
*G06F 21/55* (2013.01)
(Continued)

(52) U.S. Cl.
CPC ........ *H04L 63/1475* (2013.01); *G06F 21/554* (2013.01); *H04L 12/66* (2013.01);
(Continued)

(58) Field of Classification Search
CPC . H04L 12/66; H04L 63/1475; H04L 63/1491; H04L 63/1416; H04L 67/12; H04L 9/0869; G06F 21/554
See application file for complete search history.

(56) References Cited

U.S. PATENT DOCUMENTS 5,249,294 A   9/1993 Griffin, III et al.
5,295,187 A   3/1994 Miyoshi
(Continued)

FOREIGN PATENT DOCUMENTS

CN   102195992 A   9/2011
JP   05-070176 B2  10/1993
(Continued)

OTHER PUBLICATIONS

Takemori et al., "The decoy system to lead to a decoy data area without being detected by an unauthorized intruder", Mar. 13, 2001, pp. 391-392.
(Continued)

*Primary Examiner* — Ali S Abyaneh
(74) *Attorney, Agent, or Firm* — Birch, Stewart, Kolasch & Birch, LLP

(57) ABSTRACT

The present invention provides a relay device including: a receiving unit that receives instructions; a fuzzing detection unit that detects an illegitimate instruction among the instructions received by the receiving unit; a disguised operation decision unit that decides a disguised operation corresponding to the illegitimate instruction detected by the fuzzing detection unit; and an instruction generation unit that generates an instruction corresponding to the disguised operation decided by the disguised operation decision unit.

2 Claims, 15 Drawing Sheets

(51) Int. Cl.
*H04L 12/66* (2006.01)
*H04L 29/08* (2006.01)

(52) U.S. Cl.
CPC ...... *H04L 63/1416* (2013.01); *H04L 63/1491* (2013.01); *H04L 67/12* (2013.01)

(56) References Cited

U.S. PATENT DOCUMENTS

| | | | |
|---|---|---|---|
| 7,168,065 | B1 | 1/2007 | Naccache et al. |
| 9,647,921 | B2* | 5/2017 | Rangan ................. H04L 43/106 |
| 2002/0133603 | A1 | 9/2002 | Mitomo et al. |
| 2002/0133606 | A1 | 9/2002 | Mitomo et al. |
| 2003/0114144 | A1 | 6/2003 | Minemura |
| 2005/0166191 | A1* | 7/2005 | Kandanchatha ........ G06F 21/14 717/137 |
| 2006/0080537 | A1 | 4/2006 | Yoshizaki |
| 2012/0110667 | A1* | 5/2012 | Zubrilin ................. G06F 21/56 726/24 |
| 2013/0007881 | A1 | 1/2013 | Liem et al. |
| 2015/0066239 | A1 | 3/2015 | Mabuchi |

FOREIGN PATENT DOCUMENTS

| | | |
|---|---|---|
| JP | 2002-342279 A | 11/2002 |
| JP | 2002-539523 A | 11/2002 |
| JP | 2003-223235 A | 8/2003 |
| JP | 3611867 B2 | 1/2005 |
| JP | 2006-107274 A | 4/2006 |
| JP | 2006-221548 A | 8/2006 |
| JP | 2007-172401 A | 7/2007 |
| JP | 2007-310688 A | 11/2007 |
| JP | 2009-238153 A | 10/2009 |
| JP | 2011-170836 A | 9/2011 |
| JP | 2013-524305 A | 6/2013 |
| JP | 2013-131907 A | 7/2013 |
| JP | 2013-232716 A | 11/2013 |

OTHER PUBLICATIONS

"TCG TPM 2.0 Automotive Thin Profile", Trusted Computing Group, Mar. 16, 2015, 28 pages.
International Search Report for PCT/JP2016/062330 (PCT/ISA/210) dated Jul. 12, 2016.
Takemori et al., "The decoy system design to lead to a decoy data area without being detected by an unauthorized intruder", Mar. 13, 2001, pp. 391-392.
Office Action issued in corresponding Chinese Application No. 201880084503.9 dated Jul. 15, 2020.

* cited by examiner

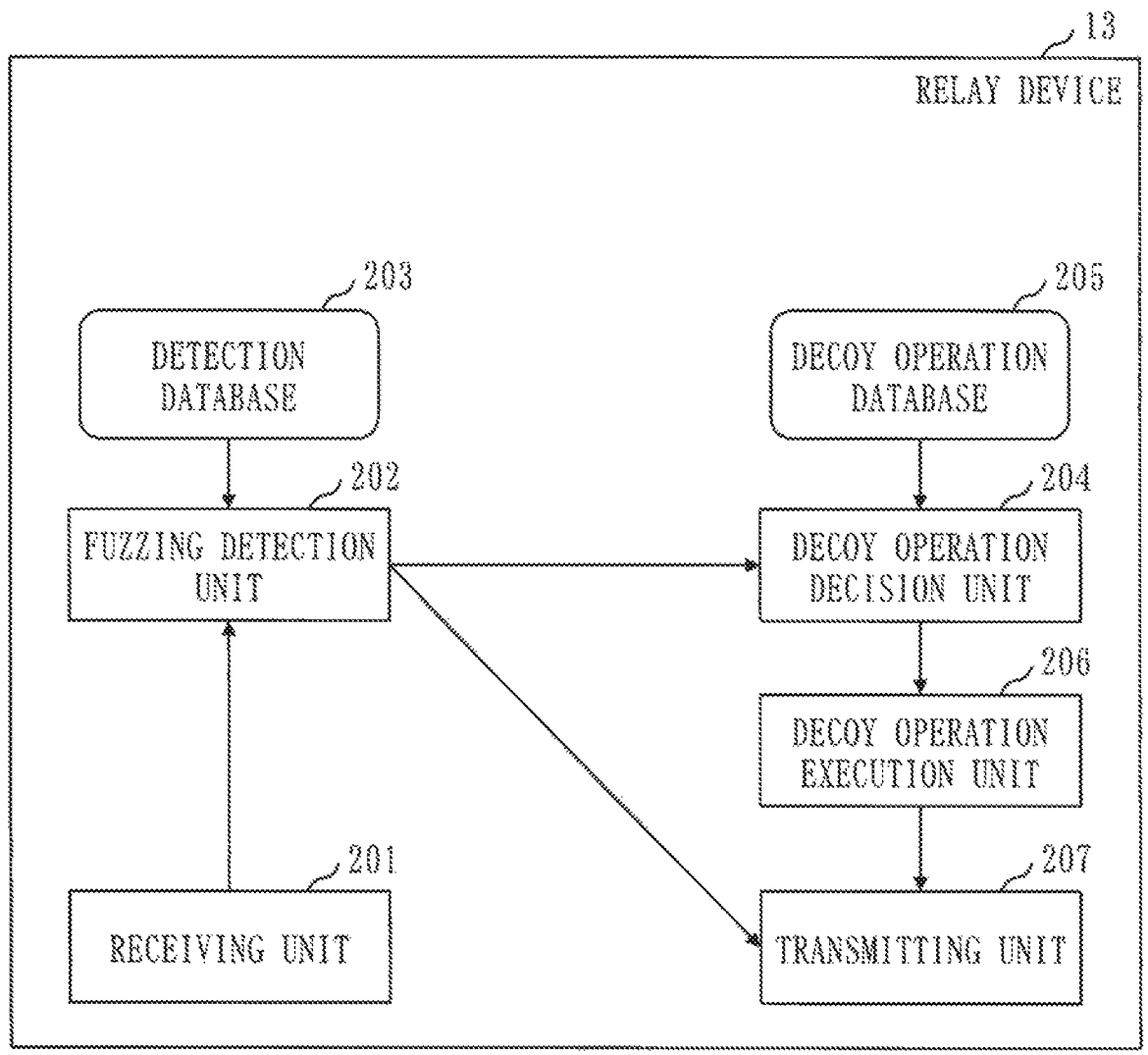

Fig. 4

DETECTION DATABASE (PERMISSIBLE MESSAGES) 203

| REGISTRATION NUMBER | VEHICLE STATE | MESSAGE ID | DATA RANGE |
|---|---|---|---|
| 1 | STOP OR DRIVING | 0x1100 | 0x10 to 0x11 |
| 2 | STOP | 0x1200 | 0x12 to 0x3f |
| 3 | STOP | 0x1300 | 0x40, 0x50, 0x60 |
| 4 | DRIVING | 0x1300 | 0x40, 0x50, 0x70 |

Fig. 5

DECOY OPERATION DATABASE (OPERATIONS TO BE EXECUTED WHEN ILLEGITIMATE MESSAGES ARE DETECTED) 205

| REGISTRATION NUMBER | MESSAGE ID | DATA PORTION | DECOY OPERATION |
|---|---|---|---|
| 1 | 0x1100 | RANDOM | DELAYING NETWORK TRANSMISSION/RECEPTION TIMING BY 10 ms |
| 2 | 0x1200 | RANDOM | ADDING UNNECESSARY DATA TO MESSAGE TO BE TRANSMITTED |
| 3 | 0x1300 | 0x12 AND ONWARDS | DELAYING I/O RESPONSE SLIGHTLY |

```
if (Msg1.CELSIUS <30) {//CONDITION 1
  PROCESS A ()
} else if (Msg1.FAHRENHEIT >= 86) {//CONDITION 2
  PROCESS B ()
}
```

| MESSAGE NAME | CELSIUS | FAHRENHEIT |
|---|---|---|
| msg1 | 25 | 77 |

```
if (Msg1. CELSIUS <30)  //CONDITION 1
   PROCESS A ()
{  if (Msg1. FAHRENHEIT >= 86) //CONDITION 2
   PROCESS B ()
}
```

| MESSAGE NAME | CELSIUS | FAHRENHEIT |
|---|---|---|
| msg1 | 25 | 100 |

DECOY OPERATION DATABASE 205
(OPERATIONS TO BE EXECUTED WHEN ILLEGITIMATE MESSAGES ARE DETECTED)

| REGISTRATION NUMBER | HASH VALUE | DECOY OPERATION |
|---|---|---|
| 1 | 0x11 | DELAYING NETWORK TRANSMISSION/RECEPTION TIMING BY 10 ms |
| 2 | 0x12 | ADDING UNNECESSARY DATA TO MESSAGE TO BE TRANSMITTED |
| 3 | 0x13 | DELAYING I/O RESPONSE SLIGHTLY |

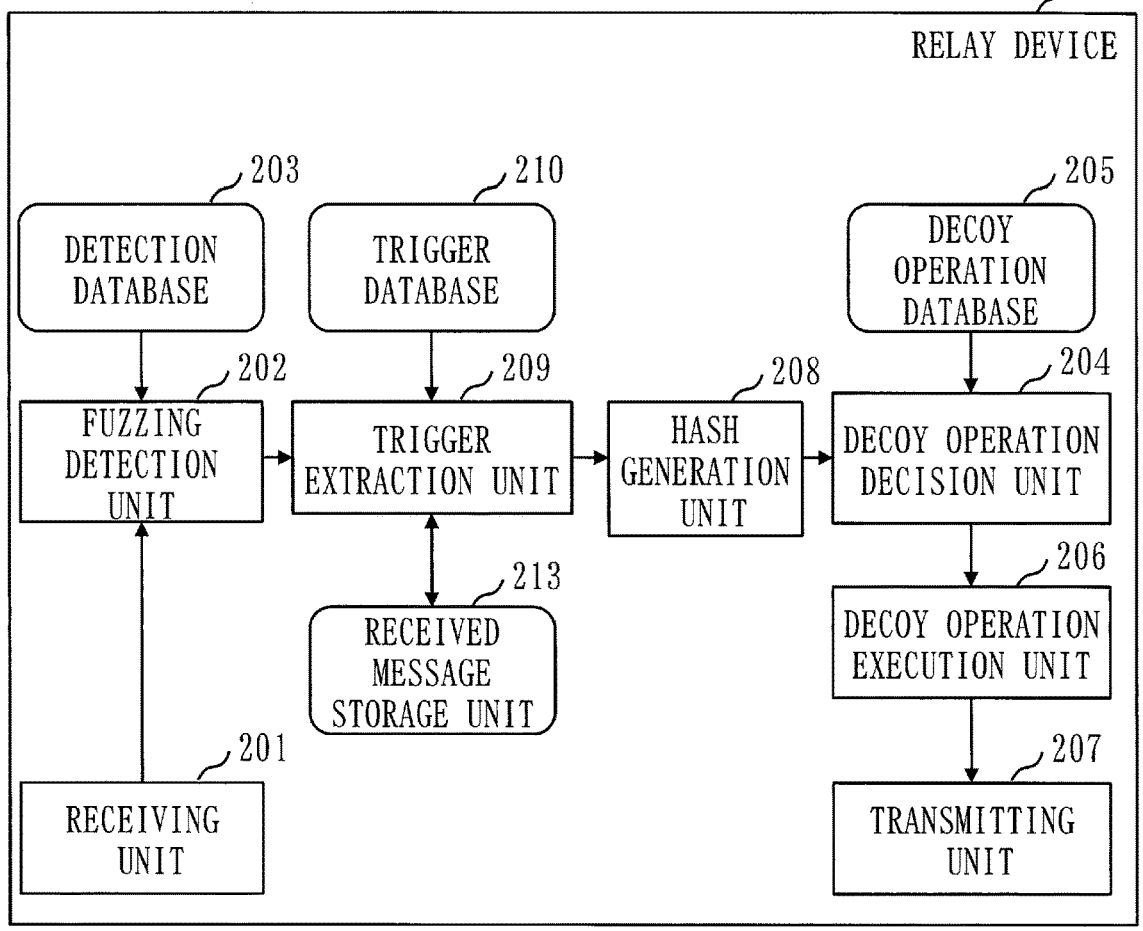

RELAY DEVICE

TECHNICAL FIELD

The present invention relates to a relay device that is mounted on an automobile, a vehicle, and the like.

BACKGROUND ART

Recently, there are increasing cases of vulnerability search attacks (fuzzing) for searching built-in information processing devices for operations that invoke vulnerabilities. Previously, smartphones, game machines, and the like have been targets, and there have been problematic cases in which the smartphones, the game machines, and the like are modified so as to exploitate illegally copied software. In the future, even automobile-mounted devices and factory automation devices are expected to be targets.

Prevalence of Internet of things (IoT) increases chances for these devices to "connect" to servers on the Internet, so that these devices are at a higher risk of being searched from everywhere for their vulnerabilities.

Code quantities of the automobile-mounted devices and the factory automation devices are on the increase year after year, and further addition of functions in the future complicates codes. As such, market introduction with vulnerabilities completely removed is on the verge of becoming extremely difficult.

With regard to such a problem, in Patent Literature 1, detection is performed based on an anomaly-based intrusion detection technique in which normal conditions of a device are defined (whitelisted) and those falling out of the whitelist are detected as attacks.

By contrast, in Non-Patent Literature 1, detection is performed based on a signature-based intrusion detection technique in which known attack procedures are made into rules (blacklisted) and those matches the blacklist are detected as attacks.

In Patent Literature 2, in a case where fuzzing is detected, the search for a vulnerability is reported to an administrator or the like, and a device targeted to be searched for the vulnerability is placed under function limitation.

CITATION LIST

Patent Literatures

Patent Literature 1: JP 2013-232716 A
Patent Literature 2: JP 2013-131907 A

Non-Patent Literatures

Non-Patent Literature 1: Akira Yamada, Yutaka Miyake, Keisuke Takemori, and Toshiaki Tanaka, "Machine Learning Based IDS with Automatic Training-Data Generation", Journal of Information Processing Society of Japan, vol. 46, No. 8, August 2005

Non-Patent Literature 2: TCG, "TPM 2.0 Automotive Thin Profile", [online], March 2015, [retrieved December 23, Heisei 27], Internet <http://www.trustedcomputing-group.org/files/static_page_files/72EC6BF8-1A4B-B294-D07BBA4AE8F4A04F/TCG%20TPM%202.0%20Automotive-Thin%20Profile_v1.0.pdf>

SUMMARY OF INVENTION

Technical Problem

Built-in information processing devices the present invention aims at involve an automobile, a factory production system, and the like. In many cases, these built-in information processing devices have limited measures to deal with fuzzing because the measures are related to safety of a user. In other words, the measures to deal with fuzzing are not allowed to cause unexpected disablement of the built-in information processing devices and to interfere with the user's safety. This means that placing the targeted device under function limitation when fuzzing is carried out is not always safe.

The built-in information processing devices have possibilities of being fuzzed under all conditions including an offline state. Examples of such cases include a factory being in a region where monitoring cannot be carried out at a remote place and the automobile running outside a network range.

There is a problem that the signature-based intrusion detection technique described in Non-Patent Literature 1 cannot deal with unknown attacks.

In Patent Literature 2, in a case where fuzzing is detected, the fuzzing being carried out is reported to the administrator or the like, and the device targeted for the fuzzing is placed under the function limitation. However, prompt reporting to the administrator or the like is impracticable because the built-in information processing device cannot always be monitored at a remote place.

Moreover, in a case where an attacker who attempts fuzzing possesses the built-in information processing device, placing the built-in information processing device possessed by oneself offline and not connecting the built-in information processing device to a specified server only are easy to do.

Information that is handled by the built-in information processing device can change through software installation by the user and the like.

With the anomaly-based fuzzing detection technique described in Patent Literature 1, there is a problem that misdetection takes place when information that is handled by the built-in information processing device changes, in this manner.

Solution to Problem

A relay device according to the present invention includes:

a receiving unit to receive instructions;

a fuzzing detection unit to detect an illegitimate instruction among the instructions;

a disguised operation decision unit to decide a disguised operation corresponding to the illegitimate instruction; and an instruction generation unit to generate an instruction corresponding to the disguised operation.

Advantageous Effect of Invention

According to the present invention, it is possible to make it difficult for an attacker making a fuzzing attack to discover a vulnerability.

BRIEF DESCRIPTION OF DRAWINGS

FIG. 2 is a block diagram illustrating an example of a function configuration of a relay device according to a first embodiment;

FIG. 3 is an example of message configuration according to the first embodiment;

FIG. 4 is a diagram illustrating an example of a fuzzing detection database according to the first embodiment;

FIG. 5 is a diagram illustrating an example of a decoy operation database according to the first embodiment;

FIG. 17 is a block diagram illustrating an example of a function configuration of a relay device according to a third embodiment;

FIG. 18 is a diagram illustrating an example of a trigger database according to the third embodiment;

DESCRIPTION OF EMBODIMENTS

First Embodiment

Figure 1:
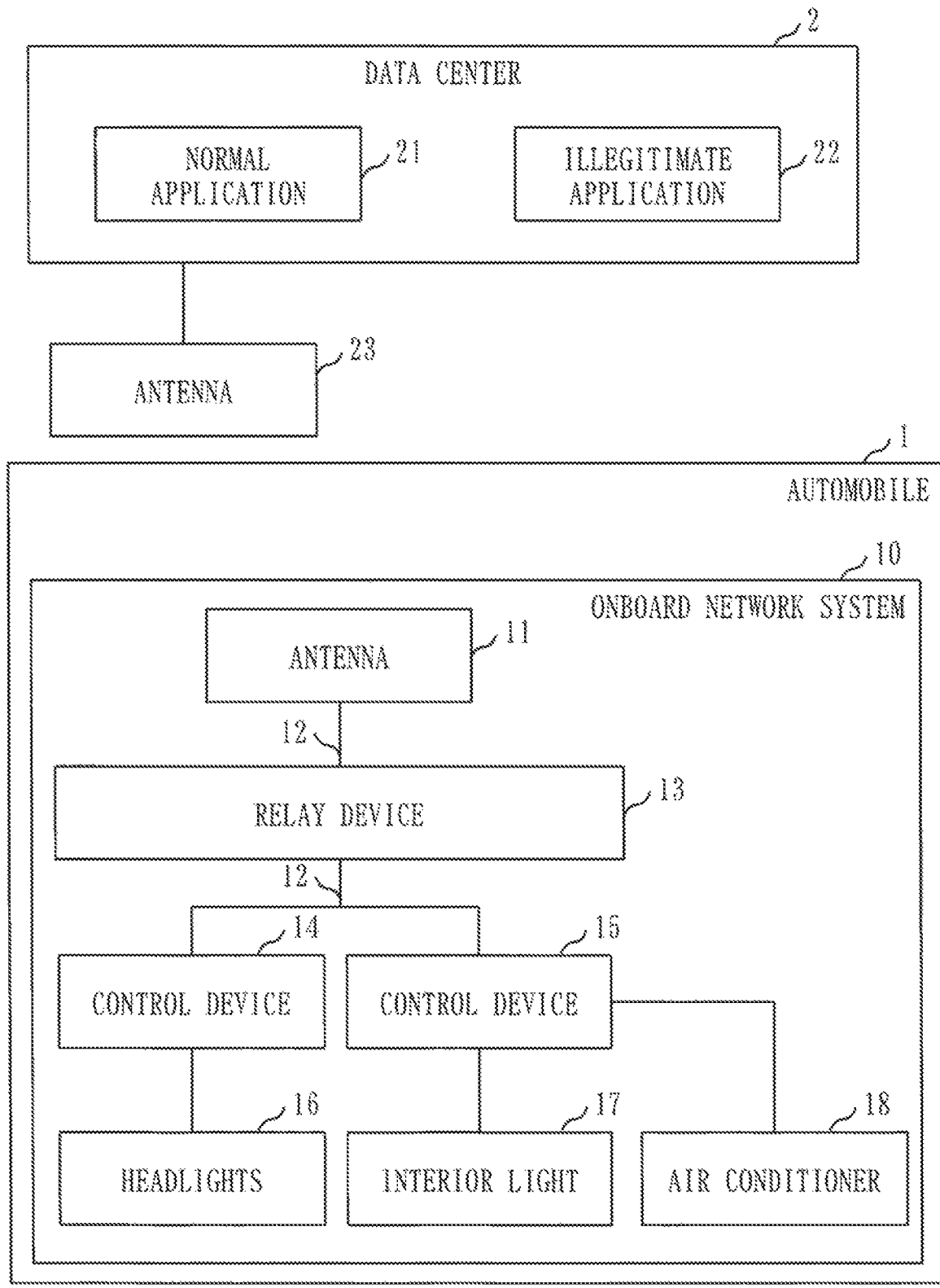
FIG. 1 is a block diagram illustrating an example of a system configuration when the present invention is applied to an onboard network system.

FIG. 1 is a block diagram illustrating a system configuration according to the present embodiment.

In FIG. 1, a reference mark 1 denotes an automobile and a reference mark 2 denotes a data center. In the present embodiment, a description is provided of a case where an onboard network system 10 that has a plurality of onboard devices is implemented in the automobile 1.

The data center 2 is formed of a normal application 21, an illegitimate application 22, and an antenna 23.

The normal application 21 is an application that transmits instructions (messages) for controlling the onboard devices of the onboard network system 10.

Similarly to the normal application 21, the illegitimate application 22 is an application that transmits messages for controlling the onboard devices of the onboard network system 10, but differs in that an attacker uses the application in search of vulnerabilities of the onboard network system 10.

In the present invention, the message for searching for the vulnerabilities is referred to as an illegitimate message (illegitimate instruction).

Although the illegitimate application 22 should not be present in the data center 2, an assumption is made here that the illegitimate application 22 sneaks in dodging application review by an administrator of the data center 2. It is well known, for example, that many illegitimate applications have possibilities of being registered in an application distribution site after smartphone application review or the like, and a similar case is assumed even in the present application.

The antenna 23 outputs the messages transmitted from the normal application 21 or the illegitimate application 22 using electromagnetic wave.

The onboard network system 10 is formed of an antenna 11, an onboard network 12, a relay device 13, a control device 14, a control device 15, headlights 16, an interior light 17, and an air conditioner 18.

The antenna 11 receives messages from outside the automobile 1.

The onboard network 12 ensures communication among the antenna 11, the relay device 13, the control device 14, the control device 15, and the like and is formed by means of, for example, a control device area network (CAN) or Ethernet (registered trademark).

The relay device 13 has functions to relay and convey to the control device 14 or the control device 15 the messages of the normal application 21 that are external to the automobile. The relay device 13 relays and conveys to the other control device, not only the messages of the normal application 21 external to the automobile, but also messages output from the control device.

The control device 14 controls the headlights 16 that are connected on board.

The control device 15 controls the interior light 17 and the air conditioner 18 that are connected.

It is to be noted that the number of onboard devices that the control device can control is not limited. For example, one control device can handle one onboard device to be controlled, or one control device can handle all the onboard devices. The control device may transmit messages to the onboard devices that are connected to other control device than the control device itself.

FIG. 2 is a functional block diagram of the relay device 13 according to the present embodiment.

A receiving unit 201 receives messages output from the data center 2 and messages output from the control devices, and output the messages to a fuzzing detection unit 202. FIG. 3 illustrates an example of message configuration. The message is formed of a message identifier (message ID) and a data portion of the message.

The fuzzing detection unit 202 determines whether the message output from the receiving unit 201 is an attack searching for a vulnerability. When the fuzzing detection unit 202 determines that the message is the attack searching for the vulnerability, the fuzzing detection unit 202 outputs the message to a decoy operation decision unit 204 as an illegitimate message.

Any method may be used as a method for the fuzzing detection unit 202 to determine whether or not the message is an attack searching for a vulnerability. However, it is to be noted that a description in the present embodiment is provided of a case where an anomaly-based intrusion detection technique that is capable of dealing with unknown attacks is used.

A detection database 203 is a database used for determination as to whether the message is the attack searching for the vulnerability. In the present embodiment, the use of the anomaly-based intrusion detection technique is assumed, so that information about normal messages is described in the detection database 203.

FIG. 4 illustrates an example of the detection database 203. In the present embodiment, an example of the case where the permissible messages are four is illustrated. For each of the permissible messages, a vehicle state, the message identifier (message ID, and the data portion (data range) are preset.

The example in FIG. 4 illustrates that the messages with registration number 1 are transmitted in a state of stop or in a state of driving and have message ID 0x1100 and the data range from 0x10 to 0x11. The example in FIG. 4 also illustrates that the messages with registration number 2 are transmitted in a state of stop and have message ID 0x1200 and the data range from 0x12 to 0x3f. The example in FIG. 4 also illustrates the messages with registration number 3 are transmitted in a state of stop and have message ID 0x1300 and the data range that is any of 0x40, 0x50, and 0x60. The example in FIG. 4 also illustrates the messages with registration number 4 are transmitted in a state of driving and have message ID 0x1300 and the data range that is any of 0x40, 0x50, and 0x70.

The decoy operation decision unit (disguised operation decision unit) 204 decides a decoy operation (disguised operation) corresponding to the illegitimate message output from the fuzzing detection unit 202, and output the decoy operation to a decoy operation execution unit 206.

A decoy operation database 205 is a database that defines a correspondence relation among the message ID used by the attacker for fuzzing, the data portion of the message, and the decoy operation to be executed when the fuzzing is detected.

It is to be noted that the decoy operation means having the control device operate by a different way from an ordinary way in a form which does not affect essential functional operations and safety of the onboard network system 10.

FIG. 5 illustrates an example of the decoy operation database 205.

The example in FIG. 5 illustrates that the decoy operation of "delaying network transmission/reception timing by 10 ms" is executed if fuzzing using the message with message ID 0x1100 is detected. The example in FIG. 5 also illustrates that the decoy operation of "adding unnecessary data to a message to be transmitted" is executed if fuzzing using the message with message ID 0x1200 is detected. The example in FIG. 5 also illustrates that the decoy operation of "delaying an I/O response slightly" is executed if fuzzing related to the message with the message ID 0x1300 and the data portion having not less than 0x12 is detected.

In the example of FIG. 5, three message IDs are described, however, the number of message IDs is not limited. In an actual onboard network system 10, not less than one hundred types of message IDs are used, so that decoy operations may be defined correspondingly.

The decoy operations may be defined according to the vehicle state or the like, as with the example of the detection database.

The decoy operation execution unit (instruction generation unit) 206 generates a message (instruction corresponding to the disguised operation) for executing the decoy operation that is output from the decoy operation decision unit 204 and corresponds to the illegitimate message output from the fuzzing detection unit 202, and outputs the generated message to a transmitting unit 207. Instead of generating the message for executing the decoy operation by the decoy operation execution unit 206, the message for executing the decoy operation may be prepared beforehand in the decoy operation database 205.

The transmitting unit 207 outputs the message output from the decoy operation execution unit 206 to the data center 2 or the control device.

Figure 6:
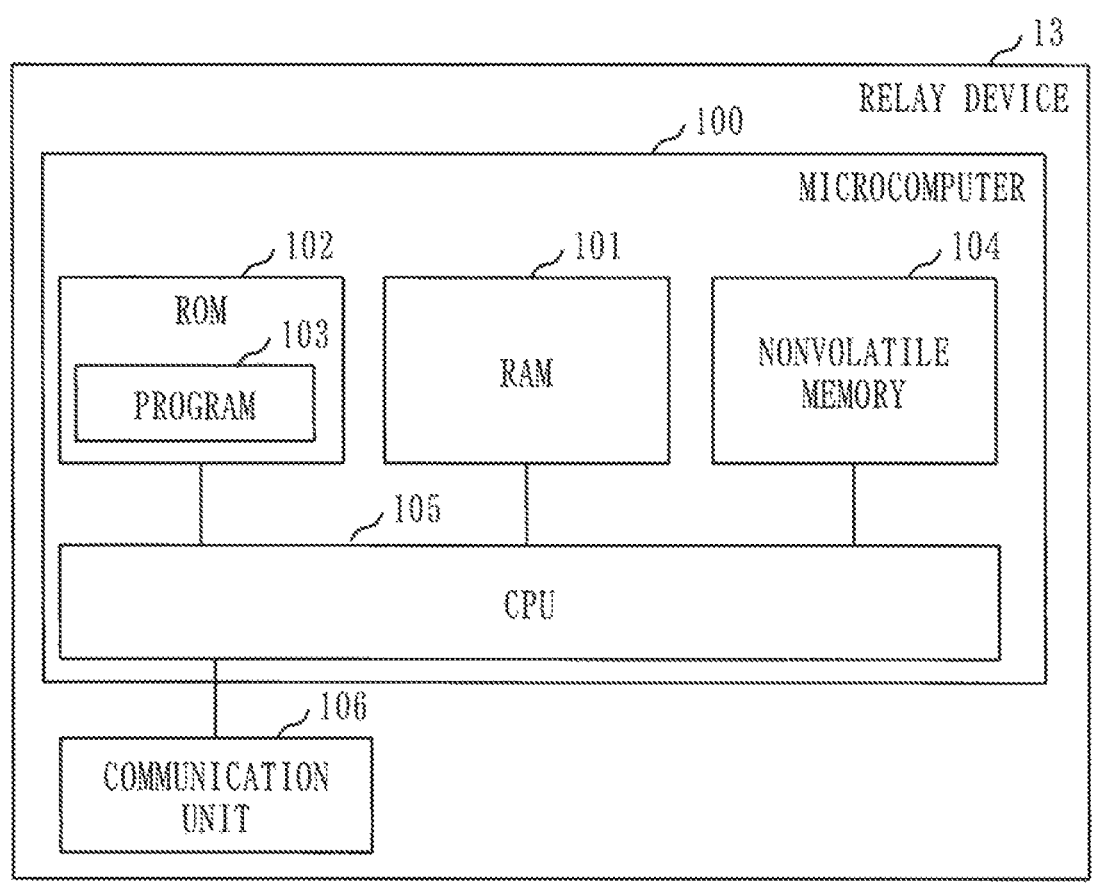
FIG. 6 is a diagram illustrating a hardware configuration of the relay device according to the first embodiment.

FIG. 6 illustrates a hardware configuration of the relay device 13 according to the present embodiment. As illustrated in FIG. 6, the relay device 13 according to the present embodiment includes a microcomputer 100, a Random Access Memory (RAM) 101, a Read Only Memory (ROM) 102, a nonvolatile memory 104, a Central Processing Unit (CPU) 105, and a communication unit 106, as key components.

In the present embodiment, the microcomputer may be of any configuration, as long as the configuration enables the CPU 105 to execute a program 103. For example, the program 103 is stored in the ROM 102 and includes at least one of the fuzzing detection unit 202, the decoy operation decision unit 204, the decoy operation execution unit 206, a hash generation unit 208, a trigger extraction unit 209, and a database updating unit 212.

These functions may be implemented not by way of the CPU 105, but by means of a field-programmable gate array (FPGA) or the like.

In the present embodiment, the microcomputer may be of any configuration, as long as the configuration enables the CPU 105 to access the detection database 203, the decoy operation database 205, and a trigger database 210 as necessary. These databases may be stored, for example, in the nonvolatile memory 104 that is rewritable.

Instead of storing these databases in the nonvolatile memory 104, for example, it is acceptable to access a database placed in a different device through the onboard network system 10.

In the present embodiment, the communication unit 106 corresponds to both the receiving unit 201 and the transmitting unit 207. The communication unit 106 can access, for example, the CAN or Ethernet (registered trademark), but are not limited to these standards. Although the antenna 11 is separated from the relay device 13 in the present embodiment, the communication unit 106 may include the antenna 11.

A description is provided next of operation.

The present embodiment discloses how the relay device 13 operates when the attacker attempts a side-channel attack to search for any vulnerability remaining in the onboard network system 10 through use of the illegitimate application 22 in the data center 2.

The search for the vulnerability is described first as a premise of the present invention.

Using the illegitimate application 22, the attacker transmits an illegitimate message to the onboard network system 10. Transmission of the illegitimate message is aimed at searching for the vulnerability of the onboard network system 10.

If the vulnerability exists in the onboard network system 10, the illegitimate message from the attacker may invoke an event observable by the attacker, such as a slight change in the network transmission/reception timing or a slight change in operation timing of a control target device, even though a serious consequence is not invoked directly.

Such a case is described with reference to FIGS. 7 to 12.

Figures 7, 8, 9:
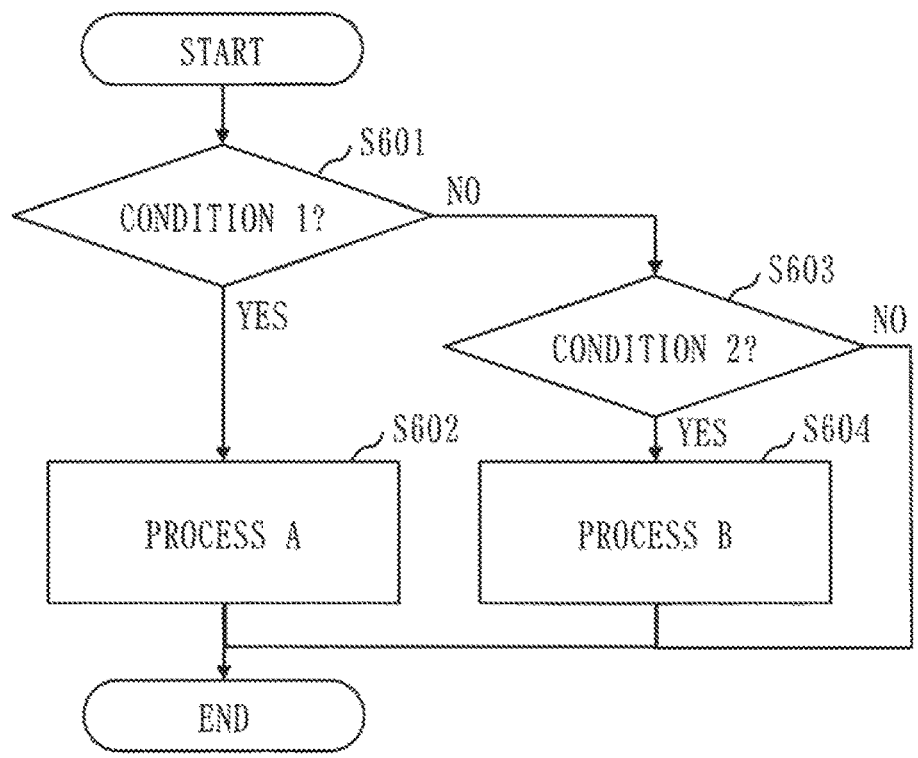
FIG. 7 is a flowchart illustrating an example of proper implementation of an application.
FIG. 8 is a pseudocode illustrating an example of implementation of the application without vulnerabilities.
FIG. 9 is a diagram illustrating an example of a conceivable message in the proper implementation.

FIG. 7 illustrates an example of implementation of an application without vulnerabilities. FIG. 8 illustrates a pseudocode corresponding to the application illustrated in FIG. 7.

A message (msg1) illustrated as an example in FIG. 9 includes information about Celsius temperature and information about Fahrenheit temperature. Using the Celsius temperature information and the Fahrenheit temperature information that are described in the received message, processing is executed as illustrated in a flowchart of FIG. 7.

With the application without vulnerabilities of FIG. 7, condition 1 and condition 2 are never satisfied simultaneously, so that process A and process B are both never executed. Even if the Celsius temperature information and the Fahrenheit temperature information contradict each other, determination based on the Celsius temperature (condition 1) takes priority, so that process A and process B are never both executed.

Figures 10, 11, 12:
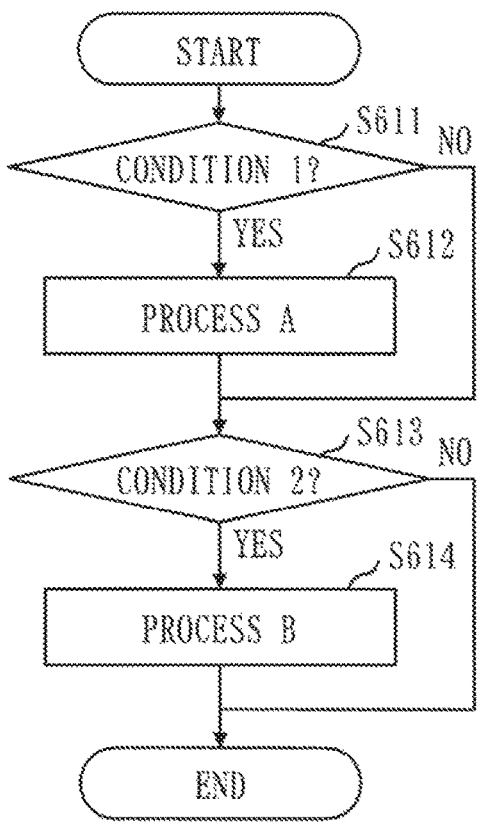
FIG. 10 is a flowchart illustrating an example of implementation of an application including a vulnerability.
FIG. 11 is a pseudocode illustrating the example of implementation of the application including the vulnerability.
FIG. 12 is a diagram illustrating an example of a message that is transmitted in an attempt to search for the vulnerability.

FIG. 10, on the other hand, illustrates an example of implementation of an application in which a vulnerability exists. FIG. 11 illustrates a pseudocode corresponding to the application including the vulnerability of FIG. 10.

In the example of FIG. 11, because of an error in a coding process, a word ("else" in the example of FIG. 11) that should be inserted is missing.

For this reason, process A and process B are both executed when receiving a message that is aimed at searching for the vulnerability, and that has a contradiction between Celsius temperature information and Fahrenheit temperature information, as illustrated by FIG. 12.

If process A and process B are both executed, a change of interval between message transmission and message reception takes place and thus can be observed by the attacker.

As described above, it is easily understood that an internal state of software becomes unstable when both process A and process B are executed.

If, for example, the same variable is incremented in process A and process B, the execution of both process A and process B can possibly cause an overflow. An attack method that takes advantage of the overflow is well known as an integer overflow attack.

The attacker observes such a slight behavioral change and determines what kind of message possibly invokes the vulnerability. If the behavioral change in the onboard network system 10 occurs by transmission of the illegitimate message, there is a possibility that its cause is the vulnerability.

Accordingly, the attacker further transmits an illegitimate message after the illegitimate message. The illegitimate message that is further transmitted can be the same as the first one in some cases and can be different from the first one in other cases. There are also cases where transmission is repeated over and over.

Through this repetition, the attacker aims for, for example, an objective behavioral change (e.g. taking over control of the automobile, installing an illegitimate application, or seizing a vehicle control program protected by intellectual property rights).

Figure 13:
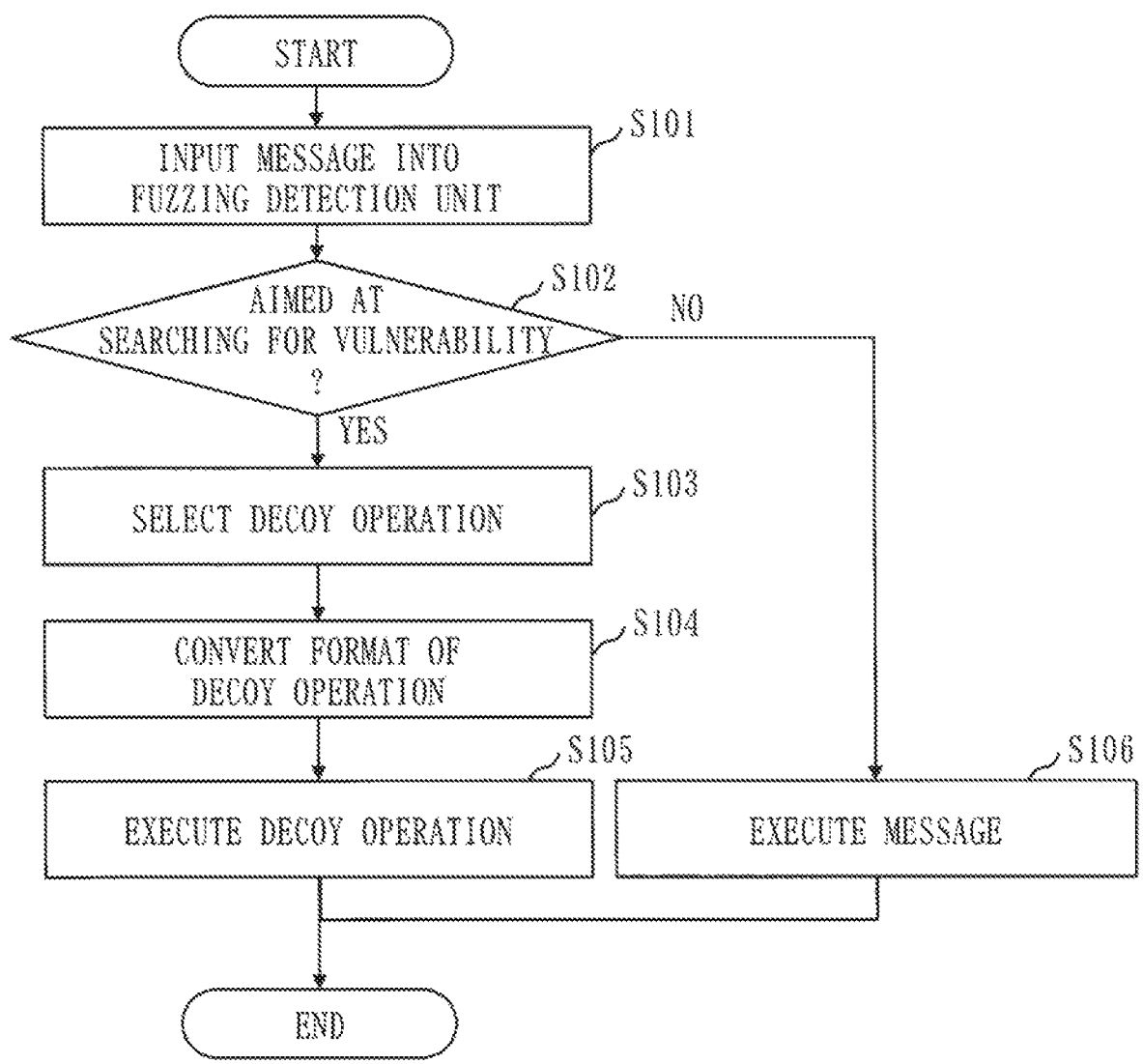
FIG. 13 is a flowchart illustrating operation of the relay device according to the first embodiment.

With reference to FIG. 13, the operation of the relay device 13 is described.

The antenna 11 outputs to the receiving unit 201 a message that is received from the outside. The receiving unit 201 outputs the message input to the fuzzing detection unit 202 (S101).

The fuzzing detection unit 202 compares the received message with the fuzzing detection database 203 to determine whether the message is aimed at searching for the vulnerability (S102).

In the present embodiment, a whitelist is used as a method of determination on the received message.

For example, the vehicle state, the message ID that is likely to arrive, the range of data portion of the message that can exist with that message ID, and the like are associated with one another and are listed in advance in the fuzzing detection database 203.

In a case where the received message does not meet these conditions, the fuzzing detection unit 202 determines that the received message is aimed at searching for the vulnerability (S102: YES).

It is to be noted that the fuzzing detection unit 202 may use a machine learning method such as deep learning or a support vector machine for its determination as to whether the received message is aimed at searching for the vulnerability. In this way, unknown attacks can be dealt with while the fuzzing detection database 203 is prevented from being bloated. As teacher data for these machine learning methods, operation logs of a test that is carried out during development can be utilized.

In the case of the message (illegitimate message) aimed at searching for the vulnerability (S102: YES), the fuzzing detection unit 202 outputs the illegitimate message to the decoy operation decision unit 204.

The decoy operation decision unit 204 compares the illegitimate message with the decoy operation database 205, selects the decoy operation to be executed and outputs the decoy operation to the decoy operation execution unit 206 (S103).

The decoy operation to be executed may be any operation such as to slightly shift the network transmission/reception timing, to instantly delay the operation timing of the control target device, to change operation of the air conditioner, which is one of the control target devices, in an illegitimate manner regardless of intention of a user, or to change operation of the interior light, which is one of the control target devices, in an illegitimate manner regardless of intention of the user. Moreover, the decoy operation may be just "do-nothing" operation.

With the example of FIG. 5 used, the operation of "delaying network transmission/reception timing by 10 ms" is executed when message ID 0x1100 in a row with registration number 1 corresponds to the illegitimate message.

While the decoy operation is defined for each message ID in the example of FIG. 5, the decoy operation may be defined according to the data portion of the message.

It is also effective to always execute the same decoy operation for the same illegitimate messages in determination of the decoy operation by the decoy operation decision unit 204. This can make the attacker think that the decoy operation is not executed simply randomly when the illegitimate message is detected in the onboard network system 10.

As stated above, the illegitimate message that does not actually invoke the vulnerability makes the attacker misinterpret that the illegitimate message invokes the vulnerability, whereby time the attacker needs to search for the vulnerability can be longer.

The decoy operations that are decided by the decoy operation decision unit 204 may not be executed with the same frequency. A consideration is given to, for example, a case where the attacker makes a brute-force attack.

Suppose possible values for the data portion of the messages range from 1 to 100. A consideration is given to the following hypothetical setting: message contents 1 to 20: decoy operation a; message contents 21 to 40: decoy operation b; message contents 41 to 60: decoy operation c; message contents 61 to 80: decoy operation d; and message contents 81 to 100: decoy operation e.

Here the attacker can transmit illegitimate messages sequentially from 1 to 100. However, illegitimate operations that can be observed are all with the same frequency. If an event relating to the vulnerability takes place when "42" is transmitted as message content, the event relating to the vulnerability can possibly be derived by taking statistics on observed event frequencies.

If the decoy operations are executed with varying frequencies such as 1 to 40: decoy operation a, 41 to 80: decoy operation b, 81 to 98: decoy operation c, 99: decoy operation d, and 100: decoy operation e, a confusion arises as to a relation between the event actually relating to the vulnerability and a behavior caused by the decoy operation, therefore, it is possible to cause the attacker to waste more time.

The decoy operation execution unit 206 converts the decoy operation to be executed into a message and output the message to the transmitting unit 207 (S104). In the case of the present embodiment, for example, the decoy operation execution unit 206 converts the decoy operation into such a form that, for example, the headlights 16, the interior light 17, or the air conditioner 18 can be controlled via the control device 14 or the control device 15.

Upon receiving the message from the transmitting unit 207, the control device performs control (the decoy operation) in accordance with the message (S105).

When an aim is determined not to search for the vulnerability in S102 (S102: NO), the fuzzing detection unit 202 outputs the message to the transmitting unit 207.

Upon receiving the message from the transmitting unit 207, the control device performs control in accordance with the message (S106).

According to the present embodiment described above, the fuzzing detection unit 202 and the decoy operation decision unit 204 are included, the fuzzing detection unit 202 determining whether the message output from the receiving unit 201 is the attack searching for the vulnerability, the decoy operation decision unit 204 deciding the decoy operation corresponding to the content of the message output from the fuzzing detection unit 202. As such, the attacker finds it difficult to distinguish the illegitimate operation resulting from the vulnerability foam the decoy operation, and accordingly, time until the vulnerability is revealed can be longer.

Second Embodiment

In the configuration disclosed in the first embodiment, the decoy operation is selected being associated with the message ID. With this configuration, when the types of message IDs increase in number, an increased storage capacity is required of the decoy operation database 205, and a processing load for the database search by the decoy operation decision unit 204 may increase.

The present embodiment discloses a configuration that reduces capacity of the decoy operation database 205 and can reduce processing load of the decoy operation decision unit caused by database search, using a hash value in place of the message ID to the decoy operation database 205.

Figures 14, 15:
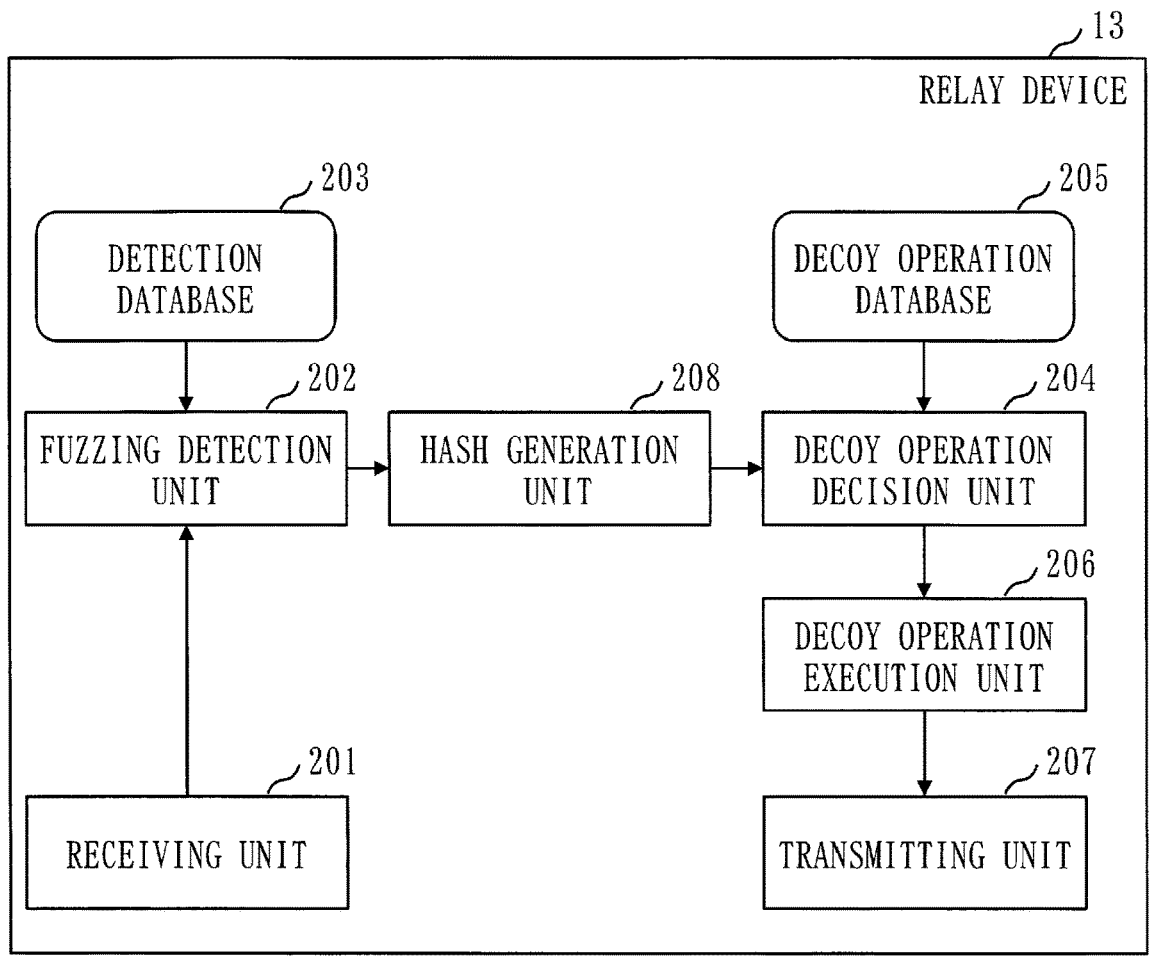
FIG. 14 is a block diagram illustrating an example of a function configuration of a relay device according to a second embodiment.
FIG. 15 is a diagram illustrating an example of a decoy operation database according to the second embodiment.

FIG. 14 is a functional block diagram of a relay device 13 according to the present embodiment. In FIG. 14, those that are identical to or respectively correspond to those in FIG. 2 have the same reference marks.

The relay device 13 according to the present embodiment has the same basic configuration as that of the first embodiment, but differs in that the hash value of the message ID is used in the decoy operation database 205, and a hash generation unit 208 is included, which generates a unique code corresponding to an illegitimate message that is output from the fuzzing detection unit 202.

FIG. 15 illustrates an example of the decoy operation database 205 according to the present embodiment. The decoy operation database 205 according to the present embodiment defines a relation between the hash generated from the illegitimate message used by an attacker for fuzzing and the decoy operation to be executed when the fuzzing is detected, unlike the first embodiment. As such, if the message ID is two bytes, and the hash is one byte long, data volume required for the decoy operation database 205 can be reduced.

When the message ID and a data portion of the message are both associated with the decoy operation, inputting the both into the hash generation unit 208 can further reduce data volume required for the decoy operation database 205.

Further, reducing the data volume of the decoy operation database 205 can produce an effect that the processing load of the decoy operation decision unit 204 is also reduced.

Figure 16:
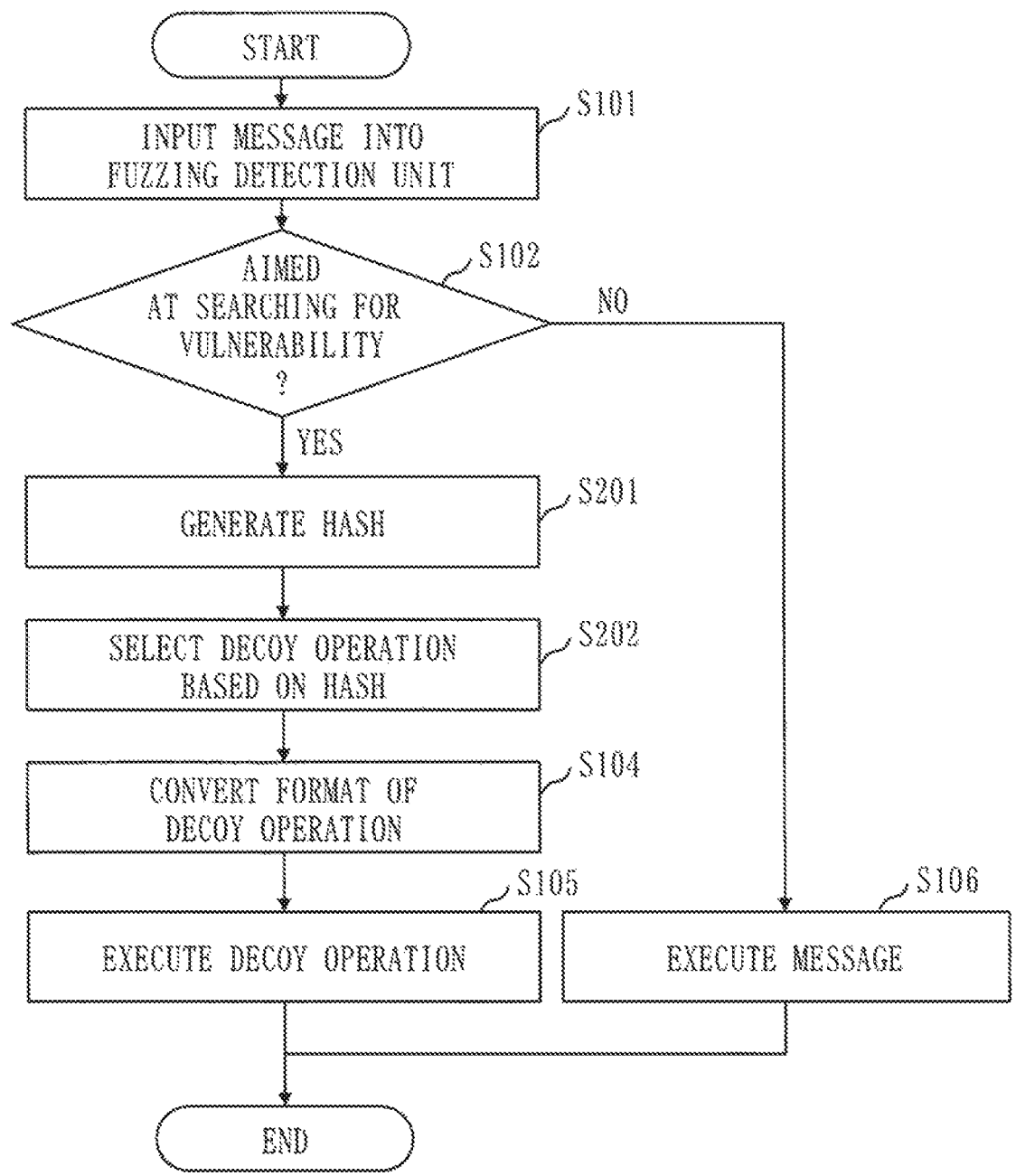
FIG. 16 is a flowchart illustrating operation of the relay device according to the second embodiment.

With reference to FIG. 16, a description is provided next of operation.

As with the first embodiment, disclosed is how the relay device 13 operates when the attacker attempts a side-channel attack to search for any vulnerability remaining in the onboard network system 10 by using the illegitimate application 22 in the data center 2.

In the present embodiment, the operation follows the same procedure as described in the first embodiment, and only difference from the operation described in the first embodiment is hereinafter described.

When the fuzzing detection unit 202 determines that it is a message (the illegitimate message) that aims at searching for the vulnerability (S102: YES), the fuzzing detection unit 202 outputs a message ID of the illegitimate message to the hash generation unit 208.

The hash generation unit 208 generates a code (hash) of the received message ID and outputs the code to the decoy operation decision unit 204 (S201).

The hash here is a numerical value obtained from summarization of the message ID, which is shorter than the original message ID, and which is fixed-length. As hash functions that can be used to generate hash, there are MD5, SHA-1, and CRC, but the hash functions are not limited to these.

The decoy operation decision unit 204 compares the given hash with the decoy operation database 205 to decide the decoy operation to be executed (S202).

The present embodiment described above, has an effect of reducing the volume of the decoy operation database 205 in addition to the effects disclosed in the first embodiment.

Third Embodiment

The second embodiment describes a case where the attacker uses a single message to search for the vulnerability. However, an attack for a vulnerability is generally made using a plurality of messages in combination. As such, when a decoy operation is decided based on a single message, if the plurality of messages are used for the search and other action than a decoy action invoked by the single message is observed, it may be determined that the action is invoked by a remaining vulnerability.

In the present embodiment, a description is provided of a case where a trigger database is used. By using the trigger database, even if the attacker uses the plurality pf messages for the search, it becomes difficult to distinguish the operation invoked by the remaining vulnerability from the decoy operation.

FIG. 17 is a functional block diagram of a relay device 13 according to the present embodiment. In FIG. 17, those that are identical to or respectively correspond to those in FIG. 14 have the same reference marks.

The relay device 13 according to the present embodiment has the same basic configuration as that of the second embodiment, but differs in that a trigger extraction unit 209, the trigger database 210, and an received message storage unit 213 are included.

Based on the trigger database 210, the trigger extraction unit 209 extracts messages received between a timing when the fuzzing detection unit detects fuzzing and a timing when a received message satisfies a predefined termination condition.

In the trigger database 210, termination conditions are registered for the trigger extraction unit 209 to extract a message. FIG. 18 illustrates an example of the trigger database 210. In the example of FIG. 18, "receive specific messages", "the number of messages received since a start condition is met", and "a time elapsed since receipt of a message meeting the start condition" are given as examples.

The condition with registration number 1 in FIG. 18, for example, indicates that messages received between a timing when an illegitimate message having message ID 0x1100 is received and a timing when a message having message ID 0x1000 is received are to be extracted.

The received message storage unit 213 is used to temporarily store the messages extracted by the trigger extraction unit 209.

Figure 19:
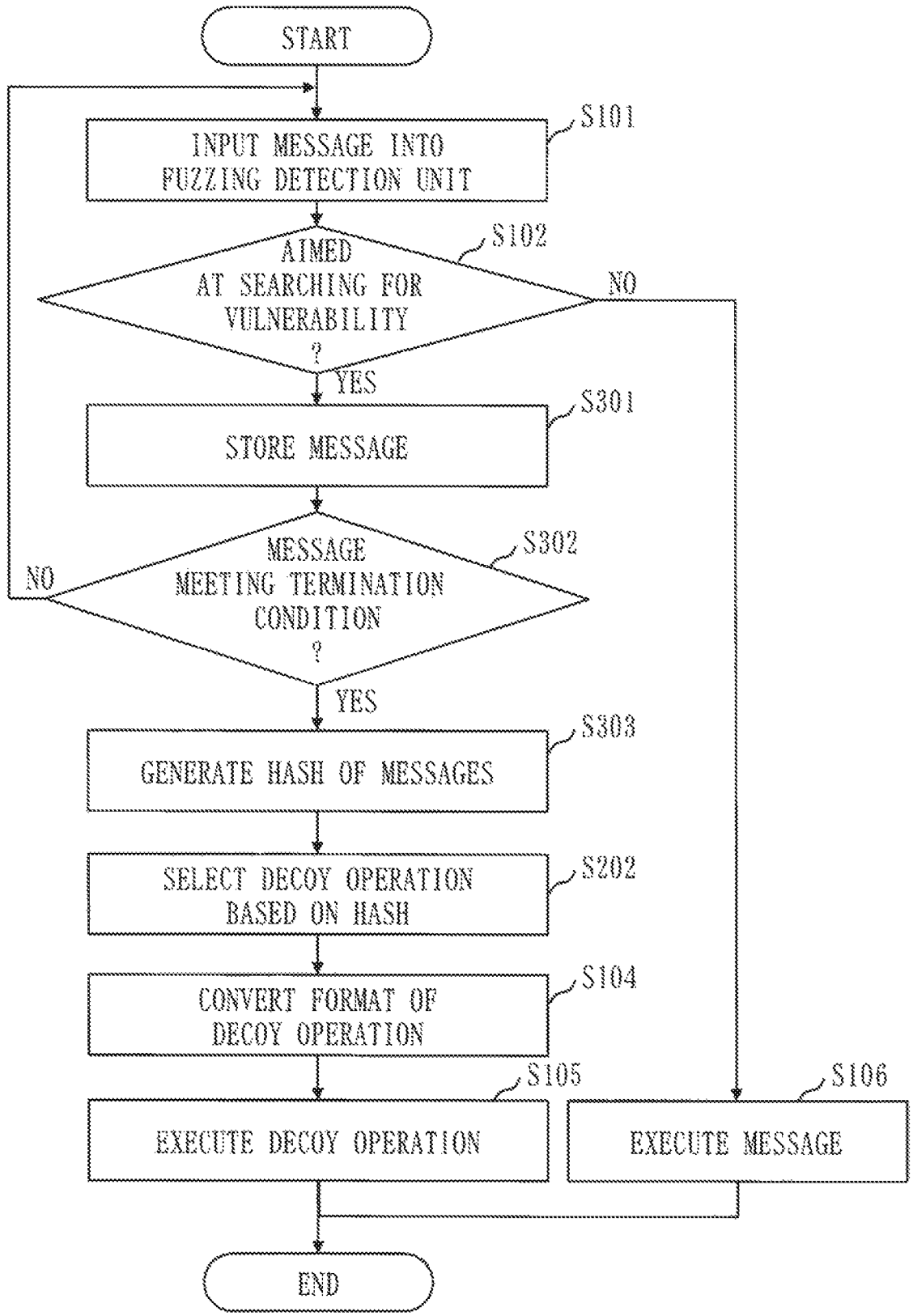
FIG. 19 is a flowchart illustrating operation of the relay device according to the third embodiment.

With reference to FIG. 19, a description is provided next of operation.

As with the first embodiment, disclosed is how the relay device 13 operates when the attacker attempts a side-channel attack to search for any vulnerability remaining in the onboard network system 10 by using of the illegitimate application 22 in the data center 2.

In the present embodiment, the operation follows the same procedure as described in the second embodiment, and only difference from the operation described in the second embodiment is hereinafter described.

When the fuzzing detection unit 202 determines that it is a message (the illegitimate message) that aims at searching for the vulnerability (S102: YES), the fuzzing detection unit 202 outputs the illegitimate message to the trigger extraction unit 209.

The trigger extraction unit 209 stores the received message in the received message storage unit 213 (S301).

The trigger extraction unit 209 determines whether the received message meets the termination condition (S302). In the case of, for example, a row with registration number 1 to FIG. 18, when a message having message ID 0x1000 is received for the first time since the detection of the illegitimate message having message ID 0x1100, the message having message ID 0x1000 is determined as "having met the termination condition".

When the received message is determined as having met the termination condition (S302: YES), the trigger extraction unit 209 outputs to the hash generation unit 208 message IDs of the plurality of messages (a group of instructions) which have been stored in the received message storage unit 213.

The hash generation unit 208 generates a hash of the message IDs of the plurality of messages (the group of instructions) (S303).

When the message ID and a data portion of the message are both associated with the decoy operation, as with the second embodiment, inputting the both into the hash generation unit 208 can further reduce the data volume required for the decoy operation database 205.

When the trigger extraction unit 209 does not determine that the received message meets the termination condition (S302: NO), the trigger extraction unit 209 waits for a subsequent message to be received. If no message is received thereafter for a fixed period of time, it may be determined that the termination condition is met.

According to the present embodiment described above, even when the attacker uses the plurality of messages to search for the vulnerability, the decoy operations can be generated, and accordingly, time until the vulnerability is revealed can be further longer.

Fourth Embodiment

If an attacker who is trying to find a vulnerability aims for stealing important information held by a target of an attack or giving a social impact, the attacker seeks for being able to randomly attack individuals of a certain product model rather than to attacking only specific individuals of the product model.

As a result of an attempted search for the vulnerability, if an operation invoking a vulnerability in an individual does not invoke the vulnerability in another individual, it is assumed that the attacker concludes that the vulnerability invoked by the operation is ascribable to individual difference.

If the attacker judges that the vulnerability which appears to be invoked is ascribable to the individual difference, the value of the operation becomes relatively lower for the attacker, thus a motivation for further search for the vulnerability becomes relatively lower.

The present embodiment aims to make the attacker misinterpret that a vulnerability is ascribable to the individual difference even if the attacker executes operation which is capable of invoking the vulnerability existing in the built-in network system, to make it difficult to identify operation which becomes a clue to reveal the vulnerability, and to make time until the vulnerability is revealed becomes longer.

Figure 20:
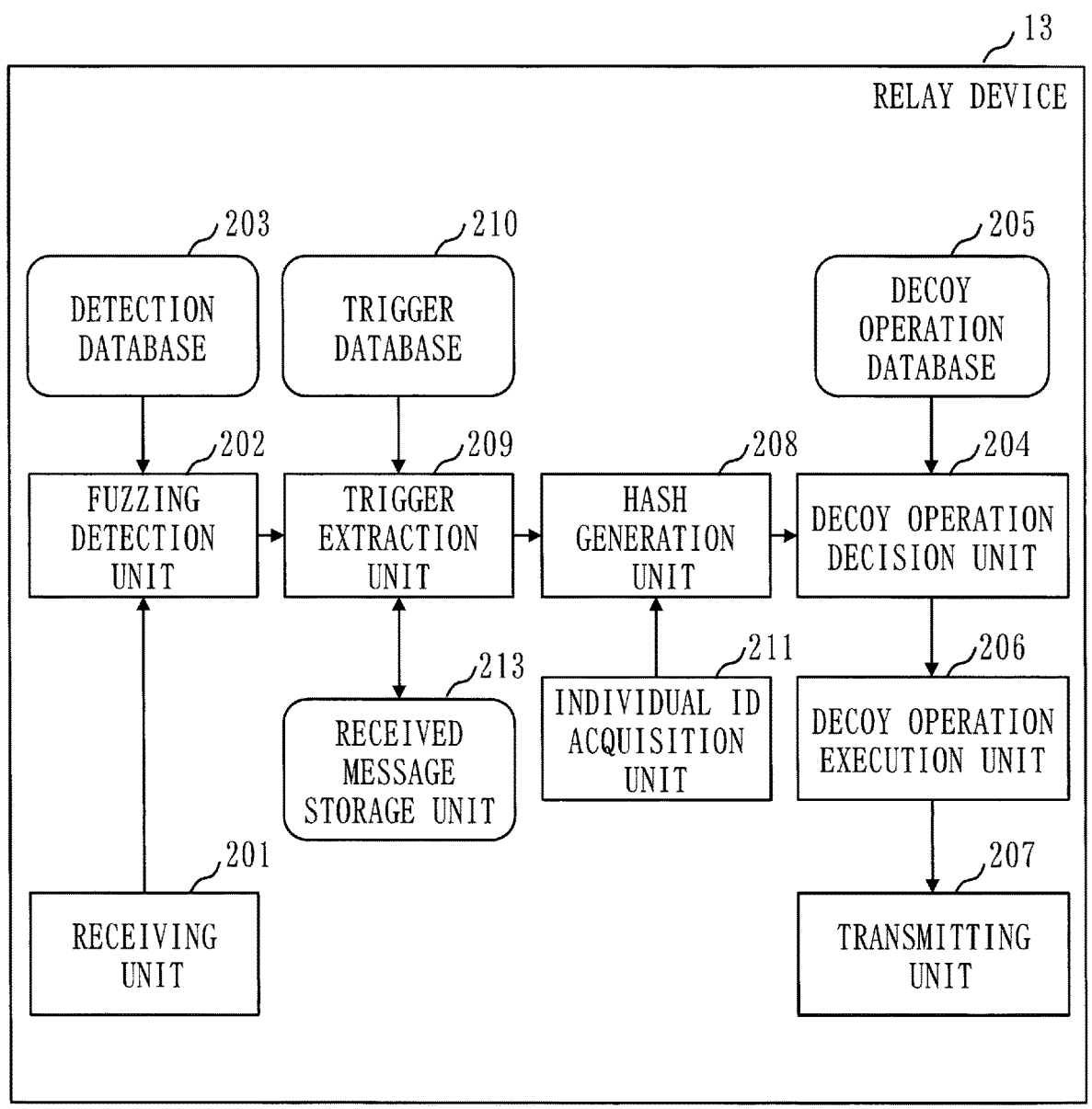
FIG. 20 is a block diagram illustrating an example of a function configuration of a relay device according to a fourth embodiment.

FIG. 20 is a functional block diagram of a relay device 13 according to the present embodiment. In FIG. 20, those that are identical to or respectively correspond to those in FIG. 17 have the same reference marks.

The relay device 13 according to the present embodiment has the same basic configuration as that of the third embodiment, but differs in that an individual ID acquisition unit (individual identifier acquisition unit) 211 is included.

The individual ID acquisition unit 211 acquires an individual ID (individual identifier) that is an identification code for identifying an individual built-in network. For example, as the individual ID, a vehicle identification number or the like can be used, in the case of an automobile.

Figure 21:
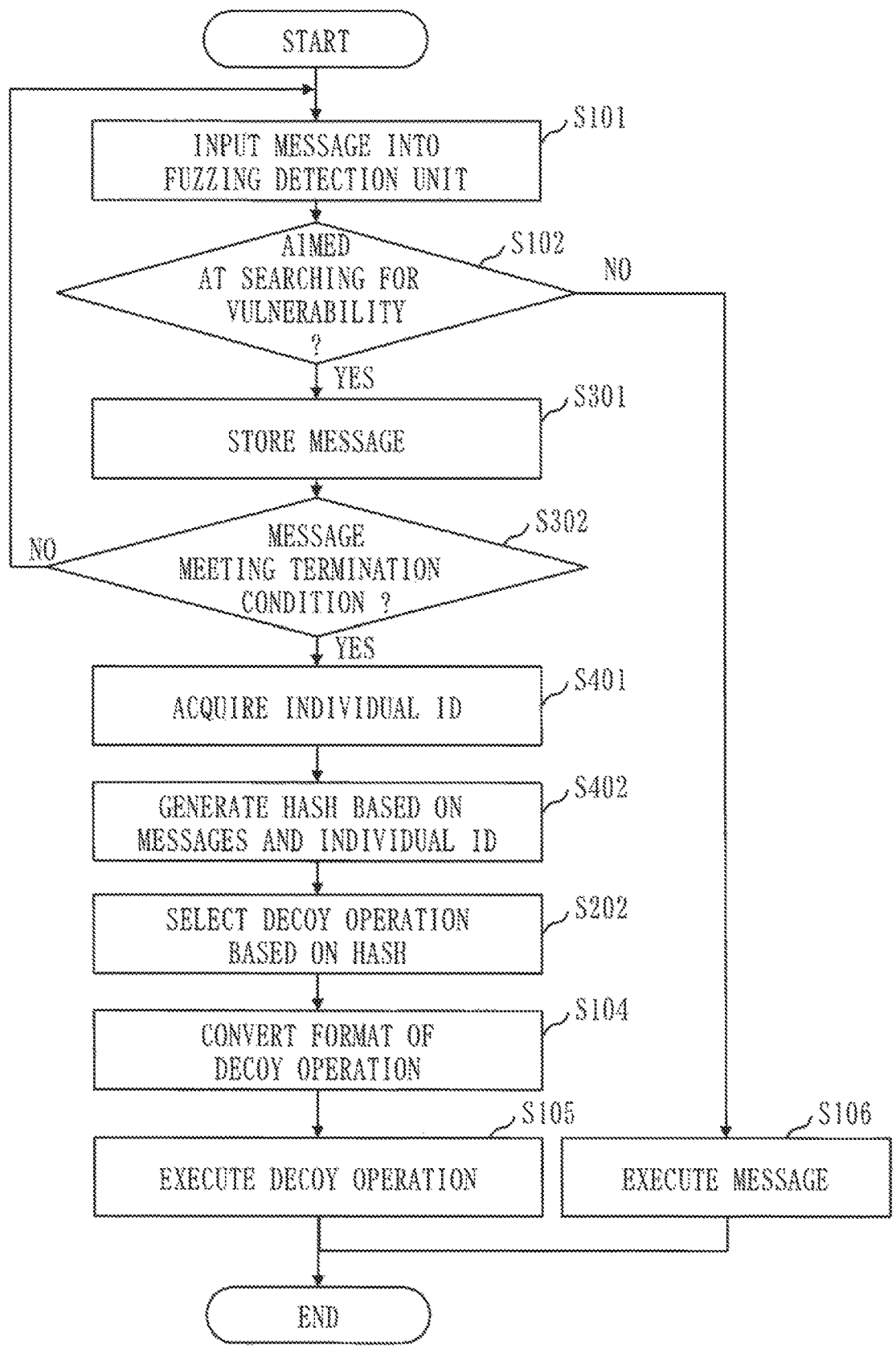
FIG. 21 is a flowchart illustrating operation of the relay device according to the fourth embodiment.

With reference to FIG. 21, a description is provided next of operation.

As with the first embodiment, disclosed is how the relay device 13 operates when the attacker attempts a side-channel attack to search for any vulnerability remaining in the onboard network system 10 by using the illegitimate application 22 in the data center 2.

In the present embodiment, the operation follows the same procedure as described in the third embodiment, and only difference from the operation described in the third embodiment is hereinafter described.

The hash generation unit 208 acquires the individual ID from the individual ID acquisition unit 211 (S401). As a method for acquiring the individual ID by the individual ID acquisition unit, there is a method of previously storing the individual ID in the relay device itself or a method of inquiring the control device included in the built-in network system.

The hash generation unit 208 generates a hash using the message IDs of the plurality of illegitimate messages (the group of instructions) that have arrived and the individual ID. The use of the illegitimate messages and the individual ID for the generation of the hash can involve the individual ID in determination on decoy operation, thereby making the attacker misinterpret that the clue observed by the attacker to the vulnerability is ascribable to the individual difference.

When the message ID and a data portion of the message are both associated with the decoy operation, as with the second embodiment and the third embodiment, inputting the both and the individual ID into the hash generation unit 208 can further reduce the data volume required for the decoy operation database 205.

According to the present embodiment described above, involving the individual ID in determination on the decoy operation makes it difficult for the attacker to distinguish an individual difference of the vehicle, a decoy operation and a behavioral change caused by the vulnerability from each other. Accordingly, the time until the vulnerability is revealed can be further longer.

Fifth Embodiment

Each of the first through fourth embodiments describes disguising the decoy operation which makes the attacker misinterpret that the operation does not conform to an intrisic specification, thereby the time required for the search for the vulnerability by the attacker becomes longer.

However, conversely, this means that if a very thorough search over a long time is conducted, the search for the vulnerability is possible.

In the present embodiment, a description is provided of a case where at least one of the fuzzing detection database 203, the decoy operation database 205, and the trigger database 210 is updated periodically to change modes of the decoy operations disguised to the attacker. Changing the modes of the decoy operations disguised to the attacker, can make the attacker search for the vulnerability again from scratch.

As such, the attacker needs to improve speed in the search for the vulnerability by using a more difficult method such as searching the plurality of built-in network devices simultaneously, otherwise the time until the vulnerability is revealed can be longer.

In the present embodiment, a description is provided of the database update.

Figure 22:
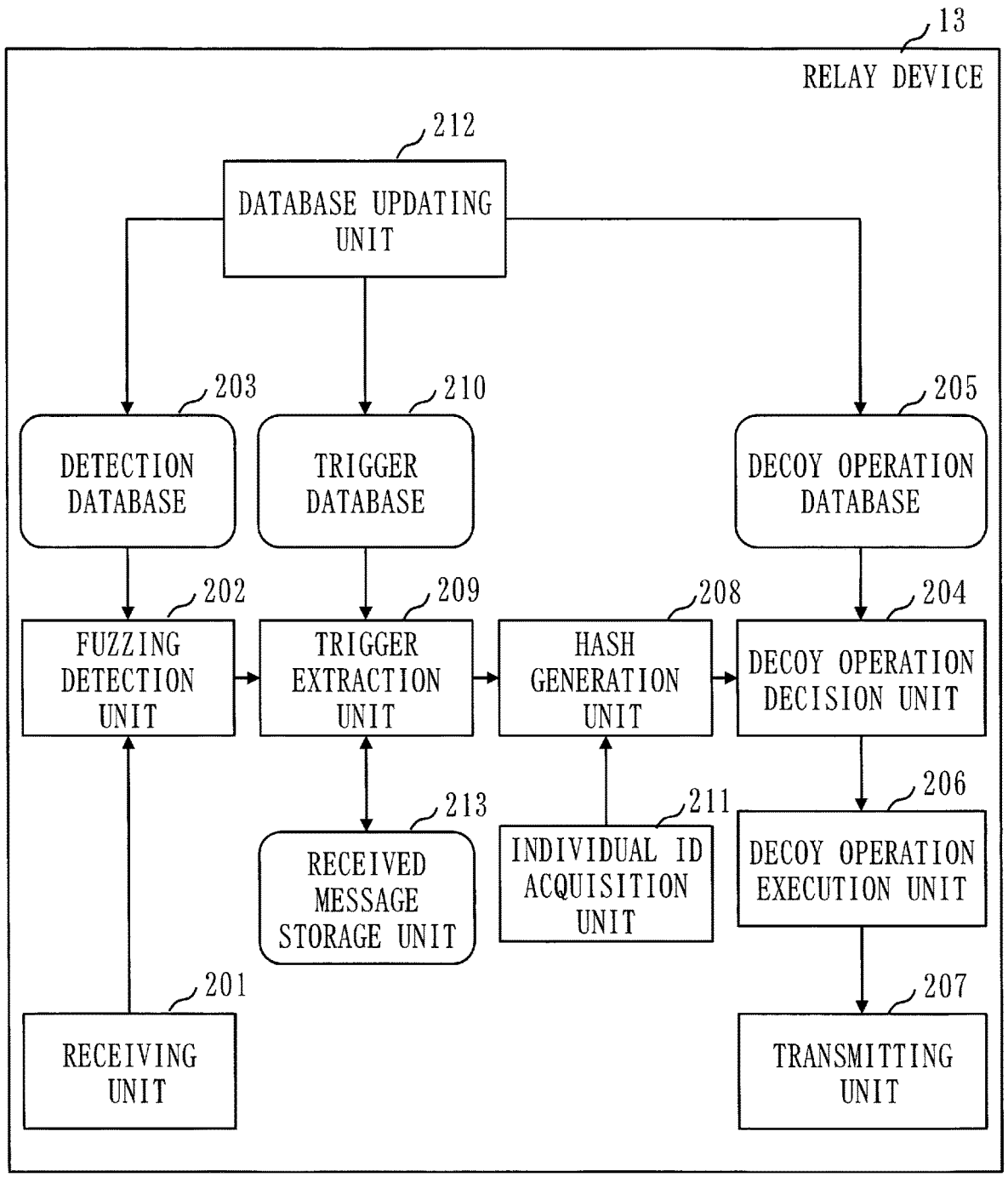
FIG. 22 is a block diagram illustrating an example of a function configuration of a relay device according to a fifth embodiment.

FIG. 22 is a functional block diagram of a relay device 13 according to the present embodiment. In FIG. 22, those that are identical to or respectively correspond to those in FIG. 20 have the same reference marks.

The relay device 13 according to the present embodiment has the same basic configuration as that of the fourth embodiment, but differs in that a database updating unit 212 is included.

The database updating unit 212 updates at least one of the fuzzing detection database 203, the decoy operation database 205, and the trigger database 210.

For example, the database updating unit 212 can be configured to periodically inquire the data center 2 whether there is updated data for each of the databases. If there is the updated data, the database updating unit 212 receives the updated data from the data center 2 and rewrites the corresponding database, using the received updated data.

Alternatively, the database updating unit 212 can be configured to update the databases on the relay device, using updated data downloaded onto an onboard diagnostic tool, after making the database updating unit 212 to conform to Unified Diagnosis Services (UDS) and making the onboard diagnostic tool connectable with the built-in network system.

Figure 23:
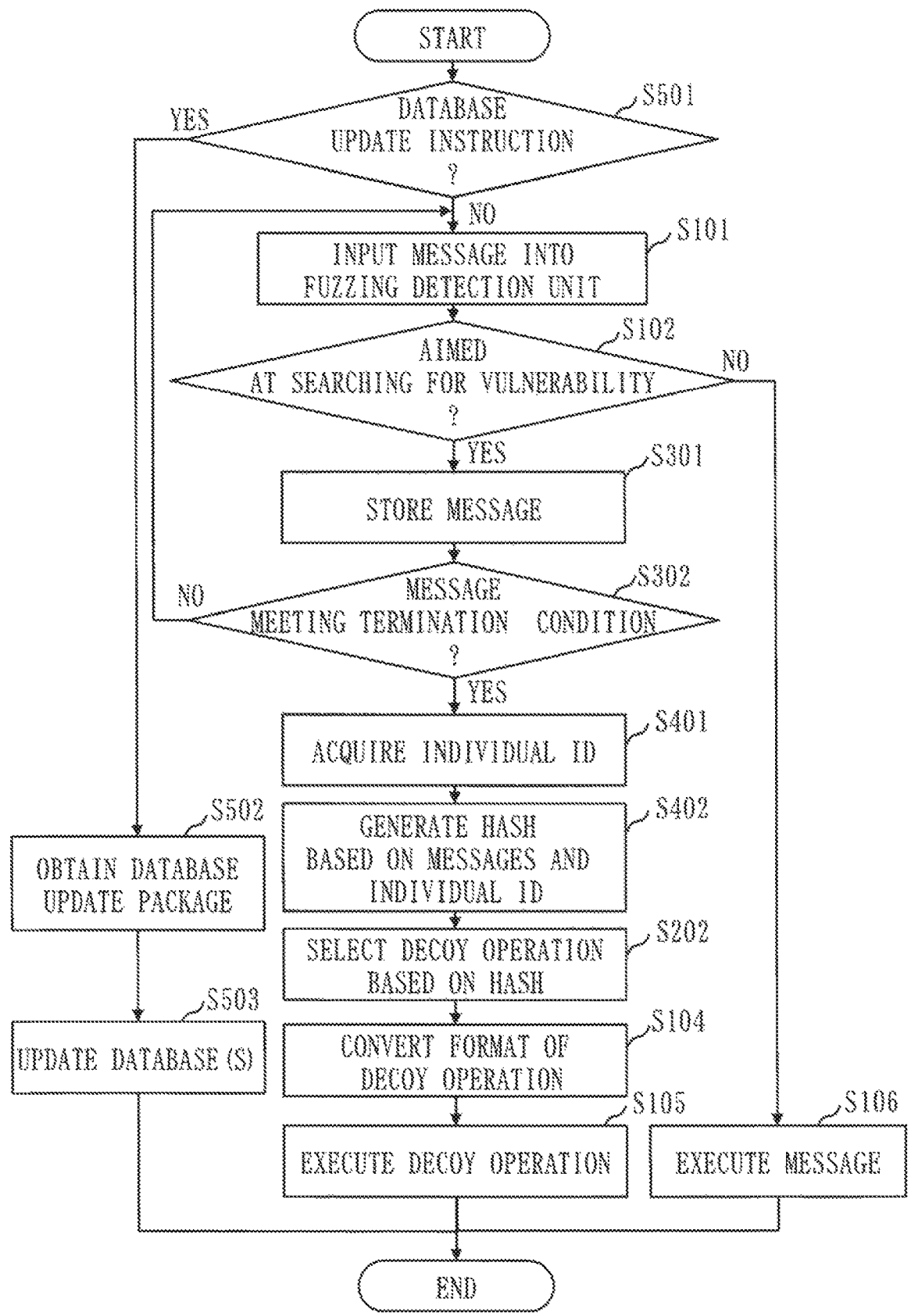
FIG. 23 is a flowchart illustrating operation of the relay device according to the fifth embodiment.

With reference to FIG. 23, a description is provided next of operation.

In the present embodiment, the databases are updated in the built-in network system. The present embodiment is based on an assumption that, a database update instruction is received via the receiving unit 201, similarly to other messages. However, another means may be used to receive the database update instruction.

In the present embodiment, matters relating to the invention are explained concisely. However, by referring to Non-Patent Literature 2 that discloses details of a remote software update method, those skilled in the art can implement the present embodiment easily.

As with the first embodiment, disclosed is how the relay device 13 operates when the attacker attempts a side-channel attack to search for the vulnerability remaining in the onboard network system 10 by using of the illegitimate application 22 in the data center 2. It is to be noted that the receiving unit 201 receives not only the messages, but also the database update instruction.

In the present embodiment, the operation follows the same procedure as described in the fourth embodiment, and only difference from the operation described in the third four embodiment is hereinafter described.

The receiving unit 201 determines whether received data is a database update instruction or a message (S501).

In a case of the database update instruction, the receiving unit transmits the data to the database updating unit 212 (S501: YES). In cases where the data received by the receiving unit 201 is the message (S501: NO), the operation is carried out in the same manner as in the fourth embodiment.

The database updating unit 212 receives a database update package via the receiving unit 201 (S502).

For example, the normal application 21 on the data center 2 transmits the database update package to the database updating unit 212. The database update package has descriptions of all or some contents or difference of the fuzzing detection database 203, the decoy operation database 205, and/or the trigger database 210 and an objective database type. With the database update package, the database update is possible.

Based on the information contained in the database update package, the database updating unit 212 updates at least one of the fuzzing detection database 203, the decoy operation database 205, and the trigger database 210 (S503).

According to the present embodiment described above, the type of the decoy operation to be selected can be changed periodically, thereby the number of attempts by the attacker for revealing the vulnerability can increase. Accordingly, the time until the vulnerability is revealed can be further longer.

REFERENCE SIGNS LIST

1: automobile, 2: data center, 10: onboard network system, 11: antenna, 12: onboard network, 13: relay device, 14: control device, 15: control device, 16: headlight, 17: interior light, 18: air conditioner, 21: normal application, 22: illegitimate application, 23: antenna, 100: microcomputer, 101: RAM, 102: ROM, 103: program, 104: nonvolatile memory, 105: CPU, 106: communication unit, 201: receiving unit, 202: fuzzing detection unit, 203: detection database, 204: decoy operation decision unit, 205: decoy operation database, 206: decoy operation execution unit, 207: transmitting unit, 208: hash generation unit, 209: trigger extraction unit, 210: trigger database, 211: individual ID acquisition unit, 212: database updating unit, 213: received message storage unit.

The invention claimed is:

1. A relay device comprising:
processing circuitry for use in controlling devices in a vehicle and configured to:
receive instructions;
detect an illegitimate instruction among the instructions;
store at least one illegitimate instruction as a group of instructions and output the group of instructions when the group of instructions meets a specific condition;
generate a hash value for the group of instructions that are output;
decide on a decoy operation where the processing circuitry operates in a different way from ordinary operations while maintaining functional operations of the devices in the vehicle, the decoy operation to be executed corresponding to the hash value, the decoy operation being different from an operation corresponding to the illegitimate instruction; and
generate an instruction corresponding to the decoy operation.

2. The relay device according to claim 1, wherein the processing circuitry acquires an individual identifier, and generates the code, using the group of instructions and the individual identifier.

* * * * *